May 12, 1970     L. R. HILL     3,511,517
SNOW SLED
Filed June 11, 1968     2 Sheets-Sheet 1
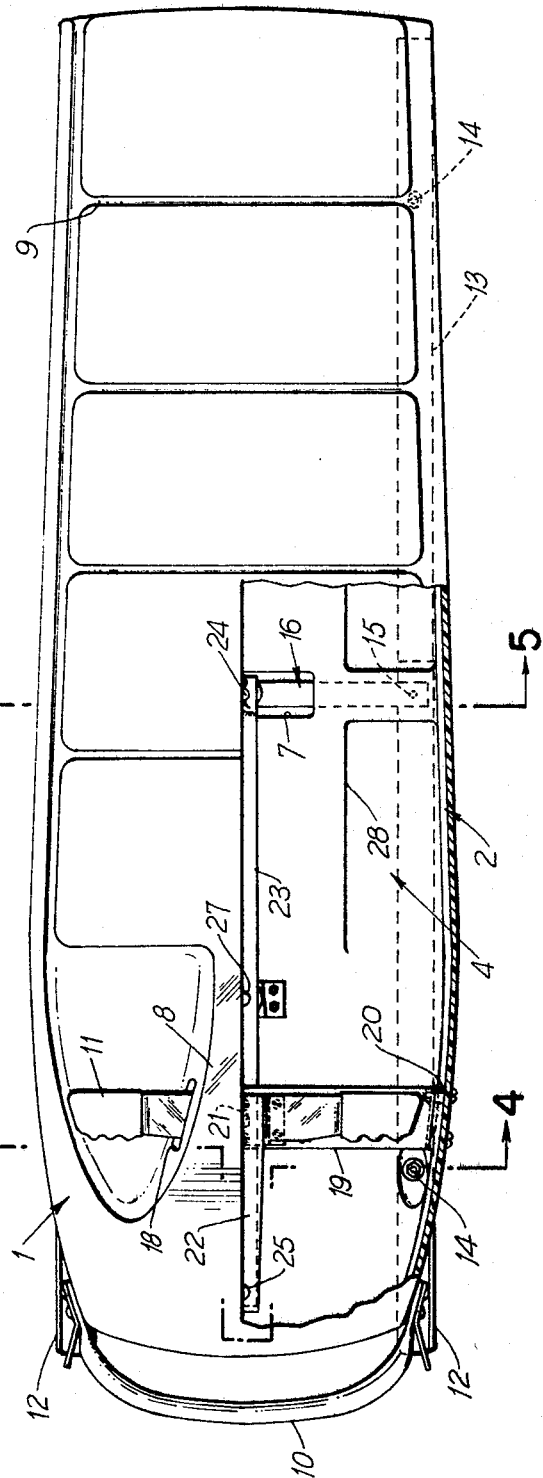
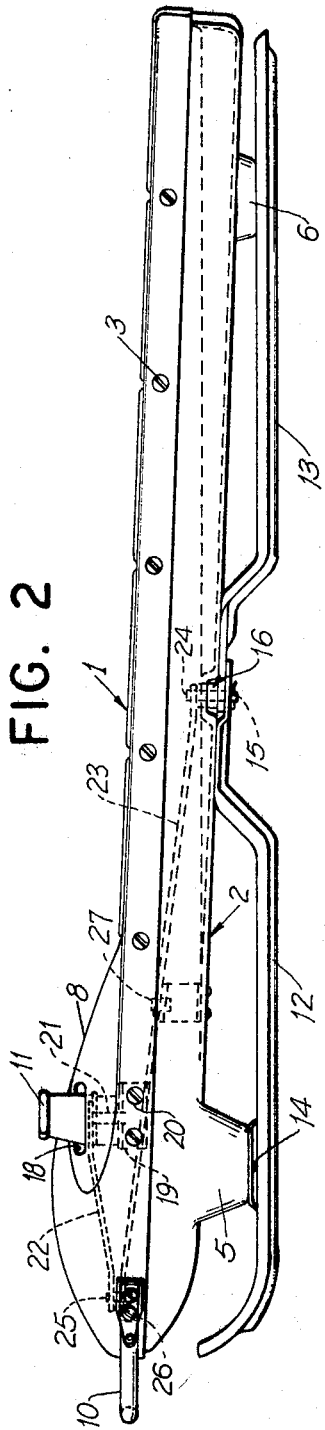
INVENTOR.
LORAN R. HILL
BY
*Walter Lewis*
ATTORNEY May 12, 1970   L. R. HILL   3,511,517
SNOW SLED
Filed June 11, 1968   2 Sheets-Sheet 2
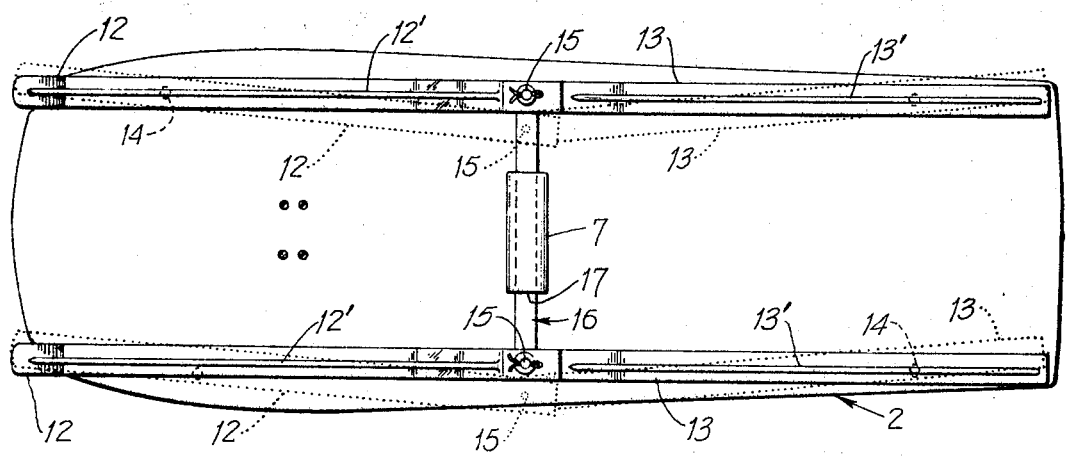
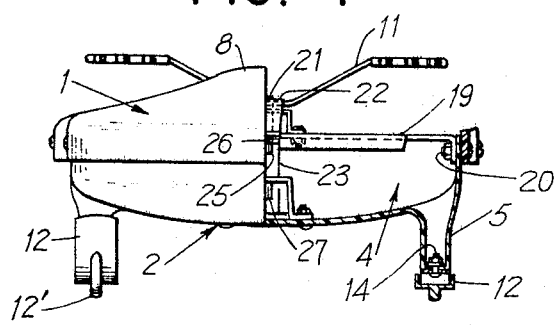
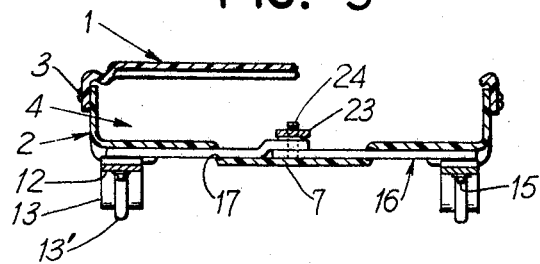
INVENTOR.
LORAN R. HILL
BY
*Walter Lewis*
ATTORNEY United States Patent Office 3,511,517
Patented May 12, 1970

3,511,517
SNOW SLED
Loran R. Hill, Olney, Ill., assignor to American Machine & Foundry Company, a corporation of New Jersey
Filed June 11, 1968, Ser. No. 736,092
Int. Cl. B62b 13/08
U.S. Cl. 280—16                                    7 Claims

ABSTRACT OF THE DISCLOSURE

The body of the sled comprises top and bottom plastic shells which are closed on each other to define a space therebetween. Pairs of front and rear ski-type runners are mounted to the bottom shell. The leading ends of the front runners and the trailing ends of the rear runners are pivotally connected to the bottom shell. The trailing end of the front runners and the leading ends of the rear runners are also pivotally jointed together. The pivot joints for the left and right side pairs of runners are constrained to move in unison by slide bar means. A steering bar is provided on the top shell. Lever means interconnecting the steering bar with the slide bar means for causing the jointed runners to be curved in the direction of turning are housed inside the space provided between the plastic shells.

---

This invention relates to a snow sled, and more particularly, to an improved snow sled having a novel body shell, runners, and steering mechanism housed in the body shell.

It is an object of this invention to provide a new and improved snow sled which is relatively low cost and easy to assemble.

It is a further object of this invention to provide a snow sled having a new and improved body shell.

It is a further object of this invention to provide a snow sled having new and improved runners for more efficient steering of the sled.

It is a further object of this invention to provide a snow sled having all of the above advantages, and in addition, a reliable and uncomplicated steering mechanism which is housed in the body shell.

Briefly, in the preferred form of the invention the body shell comprises plastic material top and bottom pan shaped elements which are closed on each other to define a closed space therebetween. The sled has a manual steering bar and front and rear ski-type runners. The means interconnecting the steering bar and the runners for turning the sled is housed in the body shell and comprises uncomplicated and reliable linkage mechanism. The runners comprise a front and rear runner on each side of the sled. The leading ends of the front runners and the trailing ends of the rear runners are pivotally mounted to the bottom pan. In addition, the trailing ends of the front runners and the leading ends of the rear runners are pivotally jointed together. The pivot joints of the left and right side pair of pivotally jointed runners are tied together by a slide bar so that both pivot joints are constrained to move in unison. When the steering bar is turned to left and right the linkage mechanism causes the tied together pivot joint of the jointed runners to move to the right and left respectively. This causes the jointed runners to in effect be curved in the direction of the desired turn.

The features of the invention which are believed to be novel are set forth with particularity in the appended claims. The invention itself, however, both as to its organization and operation, together with further objects and advantages thereof, may best be understood by reference to the following description taken in connection with the accompanying drawings, in which:

FIG. 1 is a broken away top plan view of a preferred form of the invention;

FIG. 2 is a side elevation view of the sled shown in FIG. 1;

FIG. 3 is a bottom plan view of the sled;

FIG. 4 is a sectional view taken along the section line 4—4 of FIG. 1; and

FIG. 5 is a sectional view taken along the section line 5—5 of FIG. 1.

Referring now to the drawings, the main body of the snow sled comprises a generally elongated, and hollow shell made up from top and bottom single-piece members 1 and 2 which are closed on each other. Members 1 and 2 are generally pan shaped and include peripheral rims which are nested with respect to each other. The nested rims are fastened together by removable fastening means 3. A space 4 is defined between the members 1 and 2. Space 4 encloses a steering control linkage mechanism, to be described hereinafter.

The members 1 and 2 are constructed from a molded plastic material which provides high strength and light weight. Members 1 and 2 can also be constructed from sheet metal. However, a plastic material which is high strength and light weight is preferred since a plastic can be selected which is more resistant to weathering and corrosion than low cost sheet metal. Also, a coloring agent can be added to the plastic material formulation to provide a wide range of colors for the sled, whereas metal would have to be painted or coated to color it and to also protect it from corrosion. In addition, known molding technology will make it relatively easy to form the required curvatures, depressions and reinforcing ribs in the shell members 1 and 2 during their fabrication.

For example, the bottom member 2 has pairs of downwardly extending hollow front and rear protuberances 5 and 6, and also a hollow central depression 7. The top member has a raised hollow front portion 8, and both members 1 and 2 have reinforcing ribs such as portions 9 in top member 1 and 28 in bottom member 2. All these parts can be readily integrally formed on the members 1 and 2 during their fabrication by molding.

The front of the sled is provided with a bumper bar 10. A user can use the sled by sitting on it or by being prone on it in the face or belly down position. A steer bar 11 is provided at the front of the sled to control pairs of front and rear ski-like runners 12 and 13 in a manner to be described hereinafter to obtain very quick and direct steering response. The leading ends of the front runners 12 are pivotally mounted on the shell bottom 2 at the hollow bosses or protuberances 5 by fastening means 14, and similar fastening means pivotally connect the trailing ends of the rear runners 13 to the rear bosses 6.

The leading ends of the front runners 12 are curved upwardly. The trailing ends of the front runners 12 and the leading ends of the rear runners 13 are also curved upwardly and have extensions which are overlapped and pivotally connected to each other by fastening means 15. The fastening means 15 are spaced along opposite sides of the sled and are interconnected by a slide bar mechanism 16 so that they move in unison to either the left or right. In other words, a pair of pivotally jointed runners 12, 13 are provided along opposite lateral or transverse sides of the sled bottom.

Slide bar mechanism 16 is captive in the depression 7 so that it is constrained to move in directions perpendicular to the lengthwise axis of the sled. This is accomplished by forming slots 17 in the opposite ends of the hollow depression 7. The central part of the slide bar mechanism 16 is positioned in hollow depression 7 and its opposite ends extend through slots 17 to the fastening means 15 for pivotal connection with the pivotally jointed ends of the runners.

The means for controlling the jointed runners to effect turning of the sled will now be described. The steer bar 11 extends transverse of the lengthwise axis of the sled. Opposite lateral sides of the hollow raised top front portion 8 have slots 18. The central part of steer bar 11 is positioned inside hollow portion 8 and its opposite ends extend through slots 18 in a lateral direction in raised position with respect to top member 1. Steer bar 11 is pivotally mounted at its center on a transversely extending brace member 19. Member 19 extends beneath hollow portion 8 and is fastened at its opposite ends to the rim of top member 1 by fastening means 20. Steer bar 11 is pivotally mounted on the brace member on a pivot pin or axis 21. Fixed to the central portion of steer bar 11 is a lever 22. The rear end of lever 22 is fixed to the steer bar 11 and lever 22 extends therefrom in a forward direction. Another forwardly extending lever 23 has its rear end pivotally connected to the central portion of the silde bar mechanism 16 by fastening means 24. The front end of lever 23 extends to beneath the front end of lever 22. Front end of lever 22 has a downwardly projecting pin 25 which enters an aperture 26 in the lever 23. The central portion of lever 23 is pivotally mounted on a pivot pin or axis 27. Accordingly, viewed from a position above the sled, when the steer bar 11 is turned left linkage 22, 23 causes slide bar 16 to move to the right which causes the jointed runners to be folded or jointed to the left to in effect give the jointed runners 12, 13 a curvature in the left direction. This is illustrated by dotted line outline in FIG. 3. On turning the steer bar 11 to the right the opposite happens.

Thus, during steering the jointed runners are caused to assume or approximate a curve in the desired direction of turning. This gives very direct and quick steering response. Therefore, the sled is very safe from the standpoint of avoiding collisions with other sleds or objects. In prior art sleds having only single continuous runners the steering response or rate is very slow. Also, in prior art sleds having front and rear runners, typically the front runners only do the turning and the rear runners are fixed. This of course is a better arrangement than a single continuous runner, but still a poorer arrangement than in applicant's invention in terms of quick, precise, and efficient steering. For example, since prior art fixed rear runners aren't turned in the desired direction of turning they impose a drag on the sled during turning and make a smaller turn for the same degree of movement of the front runners or steer bar.

The invention additionally provides a sled which has a small number of uncomplicated parts which can be readily fabricated and assembled. For example, the interconnecting control means between the steer bar 11 and the slide bar 16 comprises essentially only the two levers 22, 23. This interconnecting control means is readily put together since when the top member 1 is closed on the bottom member 2 the pin 25 is aligned with and enters the hole 26. The closed together shell members 1 and 2 protect the internal working parts from corrosion or weathering. Since the space 4 is essentially empty, it will be obvious to those skilled in the art that much of this space can be used for storage of outdoor winter sports equipment, such as blankets, gloves, goggles etc. Alternately, the space 4 can be filled with synthetic foam or fibre if one wishes to increase the weight of the sled or to give it a more solid feel.

The runners can be constructed from wood, plastic or metal. Like with the body shell members 1 and 2, constructing the runners from plastic will provide similar advantages. The runners have centrally located and lengthwise extending integral and downwardly projecting ridges 12' and 13' formed thereon, see FIG. 3. These ridges will bite into hard packed snow to eliminate side slippage by the runners. However, since the runners are of the flat ski type or shaped kind they will not sink too deeply into the snow. In other words, their total surface is sufficient to keep the sled bottom elevated above the snow surface except when the sled is overloaded or the snow is very soft or fluffy. However, the bottom surface of the sled is smooth and flat and its forward end is curved upwardly so that if the runners do sink deep into the snow the sled will be floated on the snow surface and the sled bottom will then slide thereover.

While there has been shown and described a particular embodiment of the invention, it will be obvious to those skilled in the art that changes and modifications may be made without departing from the invention

What is claimed:

1. A snow sled, comprising an elongated, generally flat, and hollow housing, said housing comprising top and bottom members which are closed on each other to define a closed space therebetween, a pair of elongated front runners and a pair of elongated rear runners mounted on the underside of said bottom member along opposite sides thereof, the leading ends of said front runners and the trailing ends of said rear runners having a pivotal connection with the front and rear portions respectively of said bottom member, the trailing ends of said front runners having a pivotal connection with the leading ends of said rear runners to provide jointed front and rear runners having two spaced runner pivot joints adjacent the central portion of said bottom member, means connecting said runner pivot joints together whereby said runner pivot joints are constrained to move in unison in directions transversely of said sled, a manually operable steering member positioned above said top member adjacent the front portion thereof, and means interiorly of said sled inside said closed space interconnecting said steering member and runner pivot points connecting means whereby said steerig member is adapted to move said runner pivot joints in unison to steer said sled.

2. In a sled as in claim 1, wherein said top and bottom members each comprise single piece and generally pan shaped elongated plastic material elements, the rims of said pan shaped elements being nested and removably fastened together.

3. In a sled as in claim 1, a pair of transversely spaced front and rear downwardly extending protuberances integrally formed on said bottom member, said first mentioned pivotal connections for the leading ends of said front runners and the trailing ends of said rear runners being formed at said protuberances, and another downwardly extending protuberance integrally formed on said bottom member, said another protuberance being hollow and extending transversely of the central portion of said bottom member, opposite ends of said another protuberance having slots formed therein, said runner pivot joints connecting means comprising slide bar means positioned in said another protuberance and extending at its opposite ends through said slots to said two spaced runner pivot joints and having thereat a pivotal connection therewith.

4. In a sled as in claim 1, wherein the front portion of said top member has a raised hollow protuberance integrally formed thereon along the lengthwise axis of said sled, slots formed in opposite lateral sides of said protuberance, said steering member comprising an elongated and transversely extending steer bar, said steer bar having its central portion disposed inside said protuberance and its opposite ends extending through said slots to a position above said top member, and an elongated brace fastened to the underside of said top member, said brace member extending traversely of said top member beneath said protuberance, and a pivotal connection between the central portions of said steer bar and brace member.

5. In a sled as in claim 1, said steering member comprising an elongated, transversely extending, and centrally pivoted steer bar, said runner pivot joints connecting means comprising transversely extending slide bar means having its opposite ends pivotally connected to said runner pivot joints, and said interconnecting means comprising a first forwardly extending lever having its rear end fixed to said steer bar and a second forwardly extending lever having its rear end pivotally connected to the central portion of said slide bar means, the forward ends of said levers being pivotally connected to each other, and a pivot support for the central portion of said second lever whereby when said steer bar is manually pivoted towards the right and left the slide bar means is moved to the left and right respectively to cause the jointed front and rear runner to curve to the right and left respectively.

6. In a sled as in claim 5, said top and bottom members being fastened together by removable fastening means, and the forward ends of said levers being pivotally connected to each other solely by a hole in one of said levers and a pin on the other lever which enters said hole when said top and bottom members are assembled together.

7. In a sled as in claim 1, wherein said runners have the general shape of short skis, said skis having a centrally positioned, lengthwise extending, and downwardly protruding ridge formed thereon, the underside of said bottom member being positioned above said skis in spaced relationship, and the leading ends of said front and rear skis and the trailing ends of said front skis being curved upwardly towards said bottom member.

References Cited

UNITED STATES PATENTS

| | | | |
|---|---|---|---|
| 1,407,974 | 2/1922 | Williams | 280—22 |
| 2,019,958 | 11/1935 | Fluegel | 280—22 |
| 2,098,880 | 11/1937 | Reed | 280—22 |
| 3,145,030 | 8/1964 | Millis | 280—16 |
| 3,366,395 | 1/1968 | Bjork | 280—16 |

BENJAMIN HERSH, Primary Examiner

R. R. SONG, Assistant Examiner